3,644,484
PRODUCTION OF BIS-HYDROXYALKYL ESTERS
OF BENZENE DICARBOXYLIC ACIDS
Enrique R. Witt and Donald R. Larkin, Corpus Christi,
Tex., assignors to Celanese Corporation, New York,
N.Y.
No Drawing. Filed Apr. 2, 1968, Ser. No. 718,226
Int. Cl. C07c 69/80, 69/82
U.S. Cl. 260—475 P                          10 Claims

ABSTRACT OF THE DISCLOSURE

Process for the production of bis-hydroxyalkyl phthalates by reacting an alkylene oxide with a benzene dicarboxylic acid in the presence of a catalyst and in an alkyl-substituted dioxolane reaction medium. For example ethylene oxide is reacted with terephthalic acid in a 2-ethyl, 2-methyl dioxolane reaction medium using a tertiary amine catalyst so as to produce bis(2-hydroxyethyl) terephthalate.

BACKGROUND OF THE INVENTION

The present invention relates to the production of bis-hydroxyalkyl esters of benzene dicarboxylic acids. More particularly the present invention relates to a novel and efficient process for the production of bis(2-hydroxyethyl) terephthalate.

The production of linear superpolyesters such as polyethylene terephthalate has become of significant commercial interest in recent years. One of the methods for forming these polyesters is by the polymerization of bis-hydroxyalkyl phthalates such as bis(2-hydroxyethyl)terephthalate. Probably best known and most widely used methods for producing these esters of benzene dicarboxylic acids are those in which the acid is suspended in an inert liquid medium and then reacted with an alkylene oxide in the presence of a catalyst. For example, see U.S. Pat. 3,037,049, May 29, 1962, to Alexander A. Vaitekunas which discloses the use of such liquid reaction mediums as aromatic hydrocarbons, ketones and dioxane and which also discloses the use of tertiary amine catalysts. Also such patents as Belgian Patent 666,527, Belgian 660,257, British 999,242, British 1,029,669, German 1,157,623, French Patents 1,415,134 1,430,842, 1,408,874 and Netherland Patents 6413334, 6506220 and 6508415 disclose esterification processes wherein various reaction media such as hydrocarbons, halohydrocarbons, water, alcohols, nitriles and dimethyl formamide-water are disclosed and wherein such catalysts as phosphines, arsines, quaternary ammonium compounds, stibines, amino acids, alkali sulfites, alkali chlorides and alkali nitrates are used as catalysts. Also see Belgian Pat. 696,560 which discloses the use of organic salts of quaternary ammonium ion-exchangers. Evan though all of these methods are useful for producing bis-hydroxyalkyl esters of benzene dicarboxylic acids, research is continually underway for new and efficient methods for the production of these diesters.

SUMMARY

It is thus an object of the present invention to provide a new and efficient method for the production of bis-hydroxyalkyl esters of a benzene dicarboxylic acid. It is also an object of the present invention to provide a process for the production of bis(2-hydroxyethyl) terephthalate from ethylene oxide and terephthalic acid which utilizes a novel and efficient reaction solvent. Additional objects will become apparent from the following description of the present invention.

The present invention in one of its embodiments is a process for the production of a bis-hydroxyalkyl ester of a benzene dicarboxylic acid comprising reacting a benzene dicarboxylic acid suspended in a liquid reaction medium with an alkylene oxide in the presence of a catalyst, said liquid reaction medium comprising an alkyl-substituted dioxolane having from 4 to 10 carbon atoms.

DESCRIPTION OF THE PREFERRED EMBODIMENTS

As may be seen from the above summary, the novelty of the present invention resides in the use of an alkyl-substituted dioxolane having from 4 to 10 carbon atoms. Thus the reaction media of the present invention are the cyclic acetals of the formula

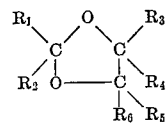

wherein at least one of $R_1$, $R_2$, $R_3$, $R_4$, $R_5$, and $R_6$ is an alkyl group and wherein the remainder are either alkyl or hydrogen, the total number of carbon atoms in the cyclic acetal being from 4 to 10, but preferably from 4 to 7 carbon atoms. The cyclic acetals useful as reaction media in the present invention are well known compounds and may be made by reacting ethylene glycol or a substituted ethylene glycol with an aldehyde or ketone according to the reaction

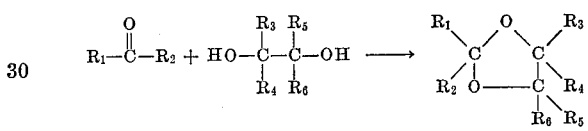

wherein $R_1$, $R_2$, $R_3$, $R_4$, $R_5$, and $R_6$ are the same as set forth above. Thus, acetaldehyde ($R_1$=CH$_3$—, $R_2$=H—) can be reacted with ethylene glycol

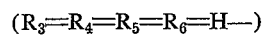

to give 2-methyl dioxolane. The preferred cyclic acetals for use in the present invention are the 2-alkyl or 2,2-dialkyl dioxolanes. According to the above formula, these 2-alkyl dioxolanes or 2,2-dialkyl dioxolanes would be those wherein $R_1$ is an alkyl group, $R_2$ is hydrogen or alkyl, and $R_3$, $R_4$, $R_5$, and $R_6$ are hydrogen. Some particular dioxolanes that may be utilized in the present process include 2-methyl dioxolane; 2-propyl dioxolane; 2-methyl, 2-ethyl dioxolane; 2-methyl, 2-butyl dioxolane; 4,4,5,5-tetramethyl dioxolane; 2-ethyl, 4-methyl dioxolane, 2-propyl, 4-ethyl, 5-ethyl dioxolane and the like. Mixtures of these dioxolanes may also be used.

At this point applicants would like to point out that the cyclic acetals of the present invention may be distinguished from the dioxane reaction medium of the prior art as they have a substantially different effect. While dioxane, which is a cyclic ether and not a cyclic acetal, may be used as a reaction medium it is objectionable because it causes a considerable reduction in reaction rate. This reduction in reaction rate is probably attributable to dioxane's competing with the alkylene oxide in some of the reaction mechanisms involved.

The process of the present invention may be conducted in various manners and may be conducted in either a batch operation or as a continuous process. In conducting the process, the benzene dicarboxylic acid, preferably in a finely divided form, is suspended by agitation in from about 1.0 to 15.0, preferably 2.5 to 11.0 times its weight of the dioxolane reaction medium and then reacted with the alkylene oxide in the presence of a catalyst. The diester product which is formed during the reaction, unlike the dibasic acid, is fairly soluble in the liquid reaction medium under the reaction conditions and therefore will generally be entirely soluble in the dioxolane reaction medium when sufficient amounts of the reaction medium are used. The temperatures to be used in the present invention may vary over a wide range from about 80 to 200° C. but are preferably from about 110 to 180° C. The pressures may range from subatmospheric to superatmospheric about the only requirement being that the pressure be sufficient to maintain a liquid phase of the liquid reaction medium. Generally it might be stated that the pressures will range from about 1 to 30 atmospheres.

The alkylene oxide usually should be present in amounts of from about 1.7 to 5 moles per mole of the dicarboxylic acid and is preferably present in amounts of from about 2 to 4 moles per mole of the dicarboxylic acid. The alkylene oxide used in the present process is preferably ethylene oxide while the preferred dicarboxylic acid is terephthalic acid although the present invention is not to be construed as limited thereto. Suitable alkylene oxides include those having from 2 to 6 carbon atoms such as 1,2-propylene oxide and 1,2-butylene oxide while other benzene dicarboxylic acids that may be used include o-phthalic acid and isophthalic acid. Mixtures of the alkylene oxides and/or the dicarboxylic acids may also be used.

In carrying out the reaction of the alkylene oxide with the diacid, it is preferable to terminate the reaction before all of the diacid has reacted. Of course, a bis-hydroxyalkyl ester may be produced practically regardless of the percentage of the diacid converted although best results are usually obtained when the residence time or reaction time is such that the reaction is terminated when from about 75 to 98% of the benzene dicarboxylic acid has been converted. The actual time required in the reaction zone will usually be from about 2 to 180 minutes.

The particular method for separating the bis-hydroxyalkyl esters from the effluent of the reaction zone does not constitute a part of the present invention and various methods will be apparent to those skilled in the art. The effluent will usually be comprised of alkylene oxide, unreacted solid dicarboxylic acid, the particular dioxolane reaction medium being used, and the soluble diester product. Such an effluent can be treated for example by first flashing the alkylene oxide followed by removal of the solid diacid by filtration, and finally cooling of the remaining diester solution so as to crystallize the diester product. The crystallized diester can then of course be removed by filtration or the like. When crystallizing a bis-hydroxyalkyl ester of a benzene dicarboxylic acid from solution in the liquid reaction medium, the particular temperature to which the solution is cooled to effect crystallization is readily determined and will vary according to the particular diester being used and the particular liquid medium being utilized. For example when crystallizing bis-(2-hydroxyethyl) terephthalate from 2-propyl dioxolane it is preferred to cool to below 40° C. and preferably below 25° C. in order to insure optimum recovery of the diester.

The catalyst to be used in the present invention can be one which is insoluble such as an ion exchange resin, but is preferably one which is soluble, i.e. the catalyst compound itself is soluble or forms soluble compounds, salts, complexes, etc. with the reactants used in the present process. Some specific classes of catalyst which may be used in the present invention are amines, arsines, stibines, phosphines, or quaternary ammonium compounds. The preferred catalysts are the amines especially the tertiary amines such as pyridine, triethylamine, tri-n-propyl amine, N-N-dimethylaniline, 2,6-dimethylpyridine and the like.

Some other specific catalysts which may be used include propyl amine, hexyl amine, diethyl amine, piperidine, triethylphosphine, tripropylphosphine, diethylphenylphosphine, triphenylarsine, triphenylstibine, benzyl trimethyl ammonium hydroxide, decyl trimethyl ammonium hydroxide, and dodecyl trimethyl ammonium hydroxide. The amount of catalyst to be used in the process of the present invention should generally be from about 0.001 to 0.1 mole per mole of the dicarboxylic acid but is preferably from about 0.01 to 0.05 mole per mole of the dicarboxylic acid.

EXAMPLE I

A 3-liter stirred autoclave was charged with 600 g. of crude terephthalic acid (3.61 moles), 1600 ml. of 2-propyl dioxolane reaction medium, 0.11 mole of tetraethyl ammonium terephthalate catalyst and then purged with nitrogen. Liquid ethylene oxide (473 g., 10.75 mole) was then pumped in and the reactor heated quickly to 155° C. by passing steam through internal coils. After about 3½ minutes the reaction was terminated by pressuring the contents of the autoclave into a vessel where the ethylene oxide was flashed and then the unreacted terephthalic acid removed by filtration. Cooling of the filtrate to about 18° C. gave about 742 grams of crude bis(2-hydroxyethyl) terephthalate.

EXAMPLE II

The procedure of Example I was repeated using a triethyl amine catalyst and a 2-methyl, 2-ethyl dioxolane reaction medium which had been prepared by the azeotropic removal of water from the acid catalyzed reaction of methyl ethyl ketone with ethylene glycol. About 780 grams of crude bis(2-hydroxyethyl) terephthalate were recovered.

The embodiments of the invention in which an exclusive property or privilege is claimed are defined as follows:

1. A process for the production of a bis-hydroxyalkyl ester of a benzene dicarboxylic acid comprising reacting a benzene dicarboxylic acid suspended in a liquid reaction medium with an alkylene oxide in the presence of a soluble catalyst selected from the group consisting of amines, arsines, stibines, phosphines, and quaternary ammonium compounds, said liquid reaction medium comprising an alkyl-substituted dioxolane having from 4–10 carbon atoms.

2. The process of claim 1 wherein said liquid medium is a 2-alkyl dioxolane having from 4 to 7 carbon atoms.

3. The process of claim 1 wherein the liquid medium is a 2,2-dialkyl dioxolane.

4. The process of claim 1 wherein the catalyst is a tertiary amine.

5. The process of claim 1 wherein terephthalic acid is reacted with ethylene oxide so as to form bis(2-hydroxyethyl) terephthalate.

6. The process of claim 5 wherein the ratio of ethylene oxide to terephthalic acid is from about 2 to 4 moles per mole.

7. The process of claim 6 wherein the temperature is from about 110 to 180° C.

8. The process of claim 7 wherein the weight ratio of liquid medium to terephthalic acid is from about 2.5 to 11.0.

9. The process of claim 1 wherein the liquid medium is 2-propyl dioxolane.

10. The process of claim 1 wherein the liquid medium consists essentially of 2-methyl, 2-ethyl dioxolane.

References Cited

UNITED STATES PATENTS

| 3,037,049 | 5/1662 | Vaitekunas et al. | 260—475 |
| 3,461,154 | 8/1969 | Lafont et al. | 260—475 |

FOREIGN PATENTS

| 1,466,001 | 12/1966 | France | 260—475 |

OTHER REFERENCES

Petrov et al.: Journal of Polymer Science, Part C, No. 16, pp. 1729–1737 (1967).

LORRAINE A. WEINBERGER, primary Examiner

E. J. SKELLY, Assistant Examiner